United States Patent [19]

Sato et al.

[11] Patent Number: 4,516,469
[45] Date of Patent: May 14, 1985

[54] ELECTRIC HYDRAULIC CONTROLL DEVICE FOR A CONSTRUCTION VEHICLE

[75] Inventors: Yoshito Sato, Hirakata; Tokuhiro Yato, Yawata; Hidemi Maeo; Yoshio Tsutsumi, both of Hirakata, all of Japan

[73] Assignee: Kabushiki Kaisha Komatsu Seisakusho, Tokyo, Japan

[21] Appl. No.: 381,701

[22] Filed: May 25, 1982

[30] Foreign Application Priority Data

May 26, 1981 [JP] Japan ................................. 81/79799

[51] Int. Cl.³ ............................................ F15B 13/16
[52] U.S. Cl. ...................................... 91/362; 60/422;
60/427; 74/577 R; 74/583; 91/513; 91/522; 91/530
[58] Field of Search .................. 91/527, 522, 521, 530, 91/513, 362, 39; 60/422, 427; 74/583 R, 577; 70/524; 318/685, 696

[56] References Cited

U.S. PATENT DOCUMENTS

| 2,175,799 | 10/1939 | Hodgman | 91/362 |
| 2,643,515 | 6/1953 | Harsch | 60/427 |
| 3,768,367 | 10/1973 | Fuzzell | 91/527 |
| 3,818,926 | 6/1974 | Wohlwend | 60/422 |
| 3,945,206 | 3/1976 | Krause | 91/527 |
| 4,281,526 | 8/1981 | Lipschultz | 70/254 |

Primary Examiner—Sheldon J. Richter
Assistant Examiner—Randolph A. Smith
Attorney, Agent, or Firm—Michael N. Meller

[57] ABSTRACT

An electric hydraulic control device for controlling hydraulic cylinders of work tools in a construction vehicle, in which control valves of the hydraulic cylinders are controlled in two ways. For some work tools which need not be controlled smoothly and finely, the corresponding control valves are controlled directly by an electric signal outputted according to the position of the operation levers, and for other work tools which must be controlled smoothly and finely, the corresponding control valves are controlled through an electric servo mechanism which is operated by an electric signal representative of the amount by which the operation lever is manipulated. In addition, there is provided a detector for detecting as to whether the transmission lever is in the locked condition, and electric systems of all of the control valves are rendered inoperative when the transmission lever is in the locked condition.

7 Claims, 4 Drawing Figures

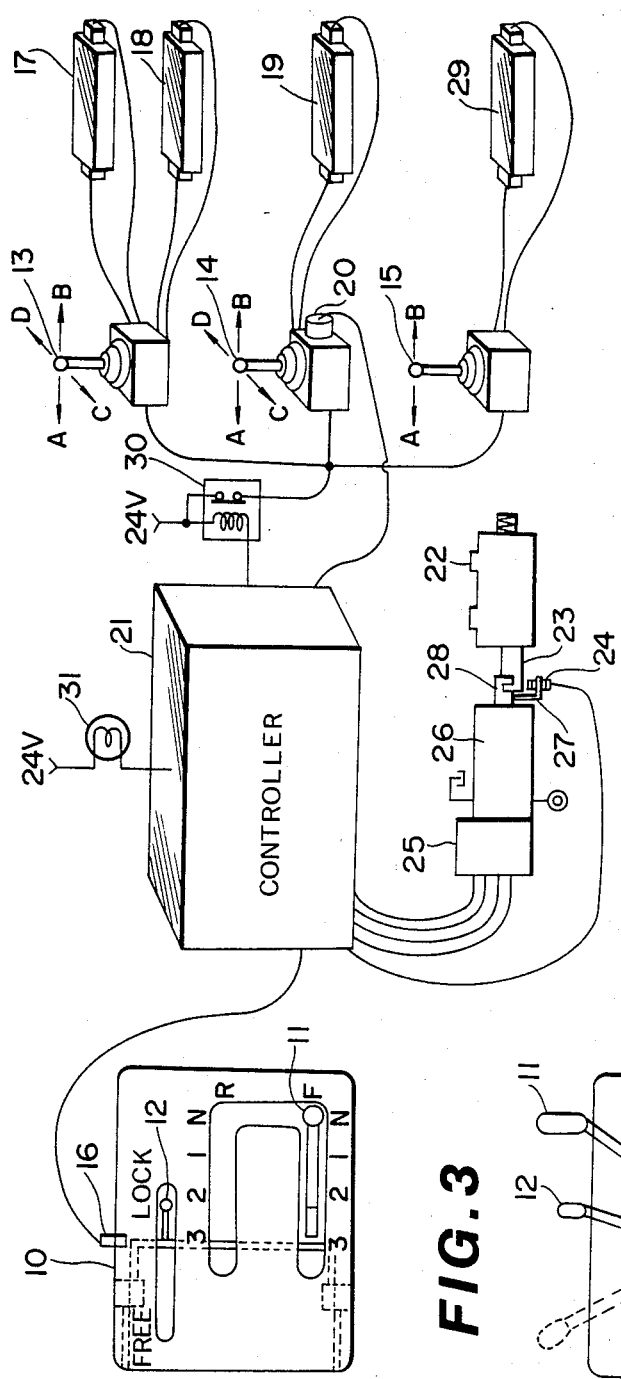
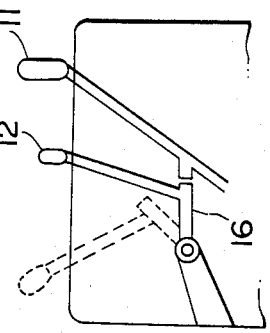
FIG. 2
FIG. 3

1

ELECTRIC HYDRAULIC CONTROLL DEVICE FOR A CONSTRUCTION VEHICLE

BACKGROUND OF THE INVENTION

1. Field of the Invention

The present invention relates to an electric hydraulic control device for a construction vehicle having work tools

2. Description of the Prior Art

In prior art, the work tools of a construction vehicle has been controlled in such a way that an operator manipulates operation levers. The movement of the operation lever is directly applied to the spool of a control valve via a link, rod, or the like so as to change the direction of hydraulic fluid of a hydraulic cylinder for operating the work tool. However, in the case of a large construction vehicle, it is difficult for the operator to operate the spool of the control valve directly by his own operating force.

Besides, since a link and rod are employed, much time has been required for the installation or removal of the control system at the time of power line change, with the resultant shortening of operation time. Moreover, automatic controlling of construction vehicles without the operator's operation has been impossible.

In addition, in the case of a bulldozer having work tools such as a blade 1 and a ripper 2, locking levers such as a pin-puller lever to be used for the insertion and removal of a pin 3, which is for installing the transmission lever for vehicle travel, the blade lever, the ripper lever and the ripper 2 on the vehicle body, has been effected by operating rock levers provided together with each of the operation levers. However, lever operation at the time of start and stop of work has been complicated due to multiplicity of lock lever operations.

SUMMARY OF THE INVENTION

Accordingly, it is an object of the present invention to provide an electric hydraulic control device for construction vehicles capable of reducing the operating force of operation levers, shortening the lower line change time, and locking all operation levers by a single lock lever.

Another object of the invention is to provide an electric hydraulic control device for construction vehicles, in which the spool of the control valve is operated electrically without mechanical lever operation, thus reducing the operating force of operating levers.

Still another object of the invention is to provide an electric hydraulic control device for construction vehicles in which control valves by which work tools of the vehicle are controlled smoothly and finely are so designed that position of the spool thereof is controlled according to the stroke of control levers whereby the flowrate of hydraulic fluid may be controlled according to the position.

A further object of the invention is to provide an electric hydraulic control device for construction vehicles, in which all control valves thereof are electrically controlled, thus enabling all machine tools to be locked by a single lock lever which locks a transmission lever for vehicle travel.

A still further object of the invention is to provide an electric hydraulic control device for construction vehicles which enables reduction of power line change time and readiness to automatically operate construction vehicles.

According to the present invention, the control valve of the hydraulic cylinder operating the work tool of a construction vehicle is so designed that it is controlled by an electric signal outputted according to the operating position of the operation lever when the work tool is not required to perform a smooth and delicate operation, while the spool of the control valve is controlled through an electric servo mechanism operated by an electric signal outputted according to the amount by which the operation lever is manipulated when the work machine is required to perform a smooth delicate operation. In addition, a detector detecting the locked condition of the construction vehicle transmission lever is provided, and the electric systems of these two kinds of control valve are made inoperative respectively based on the output of the detector.

BRIEF DESCRIPTION OF THE DRAWINGS

In the accompanying drawings,

FIG. 2 is a schematic block diagram illustrating a preferred embodiment of an electric hydraulic control device for a construction vehicle according to the present invention;

FIG. 3 is a side view of the transmission control box shown in FIG. 2; and

DETAILED DESCRIPTION OF THE PREFERRED EMBODIMENT

Figure 1:
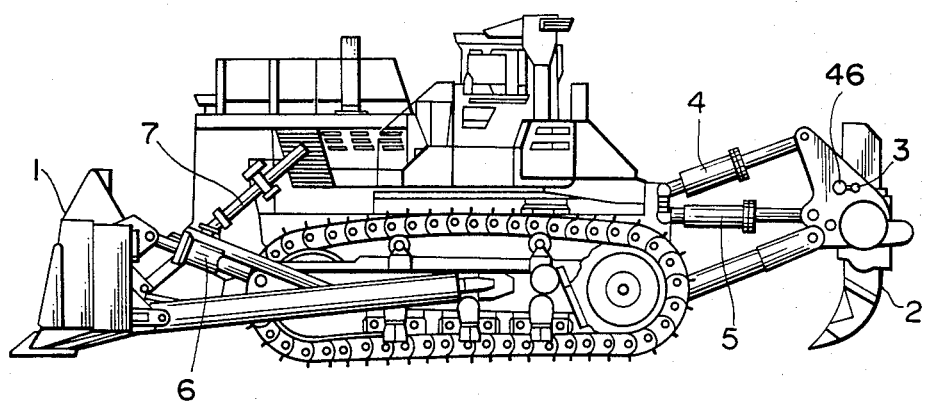
FIG. 1 is a side view of a construction vehicle to which this invention is applied.

FIG. 2 shows a schematic block diagram of the electric hydraulic control device for a construction vehicle according to the present invention in relation to the electric hydraulic devices of the bulldozer shown in FIG. 1. In this bulldozer, there are provided a multiplicity of operating levers, such as a vehicle travel transmission lever 11 and a lock lever 12 in a transmission control box 10 together with a ripper lever 13, a blade lever 14, and a pin-puller lever 15. The transmission lever 11 can change the vehicle speed in three steps both in forward and backward runs in response to changes in its position. The lock lever 12 locks the transmission lever 11 by changing the lock lever position from the position shown by a broken line (free position) to the position shown by a solid line (lock position) during a period when the transmission lever 11 is in the neutral position N as shown in FIG. 3. A non-contacting switch 16 for detecting the lock position of the lock lever 12 is provided in the transmission control box 10.

The ripper lever 13 is for operating a ripper 2. As the ripper lever 13 is moved in the A or B direction, a solenoid valve 17 for driving a ripper tilt cylinder 4 (FIG. 1) is controlled, while as the ripper lever 13 is moved in the C or D direction, a solenoid valve 18 for driving a ripper lift cylinder 5 (FIG. 1) is controlled.

The blade (FIG. 1) lever 14 is for operating a blade 1. As the lever 14 is moved in the A or B direction, a solenoid valve 19 for driving a blade tilt cylinder 6 (FIG. 1) is controlled, while as the lever 14 is moved in the C or D direction, signals representative of the operating direction and operating stroke are applied from a potentiometer 20 to a controller 21. On the other hand, a signal representative of the position of a spool 23 of the control valve 22 for driving a blade lift cylinder 7

(FIG. 1) is applied from a differential transformer 24 to the controller 21. The controller 21 drives a stepping motor 25 according to the deviation between these two input signals. The driving force produced by the stepping motor 25 is applied to a stepping cylinder 26 through a boosting mechanism employing hydraulic fluid to protract and retract the cylinder 26. A movable core 27 of the differential transformer 24 and the spool 23 are coupled to an output shaft 28 of the stepping cylinder 26. Accordingly, the blade lift cylinder 7 (FIG. 1) can be controlled by moving the lever 14 in the C or D direction.

The pin-puller lever 15 controls a solenoid valve 29 for driving a cylinder (not shown) which inserts and pulls out the pin 3 for locking the ripper 2 into and from the vehicle body. The pin 3 is extracted as the lever 15 is manipulated in the A direction, and is inserted as the lever 15 is moved in the B direction.

The controller 21 controls the stepping motor 25 as well as turns off a contact 30a (FIG. 4) of a relay 30 upon the reception of a lock signal from the non-contacting switch 16, causes the stepping motor 25 to become inoperative, and also causes a lock indicating lamp 31 to light.

Figure 4:
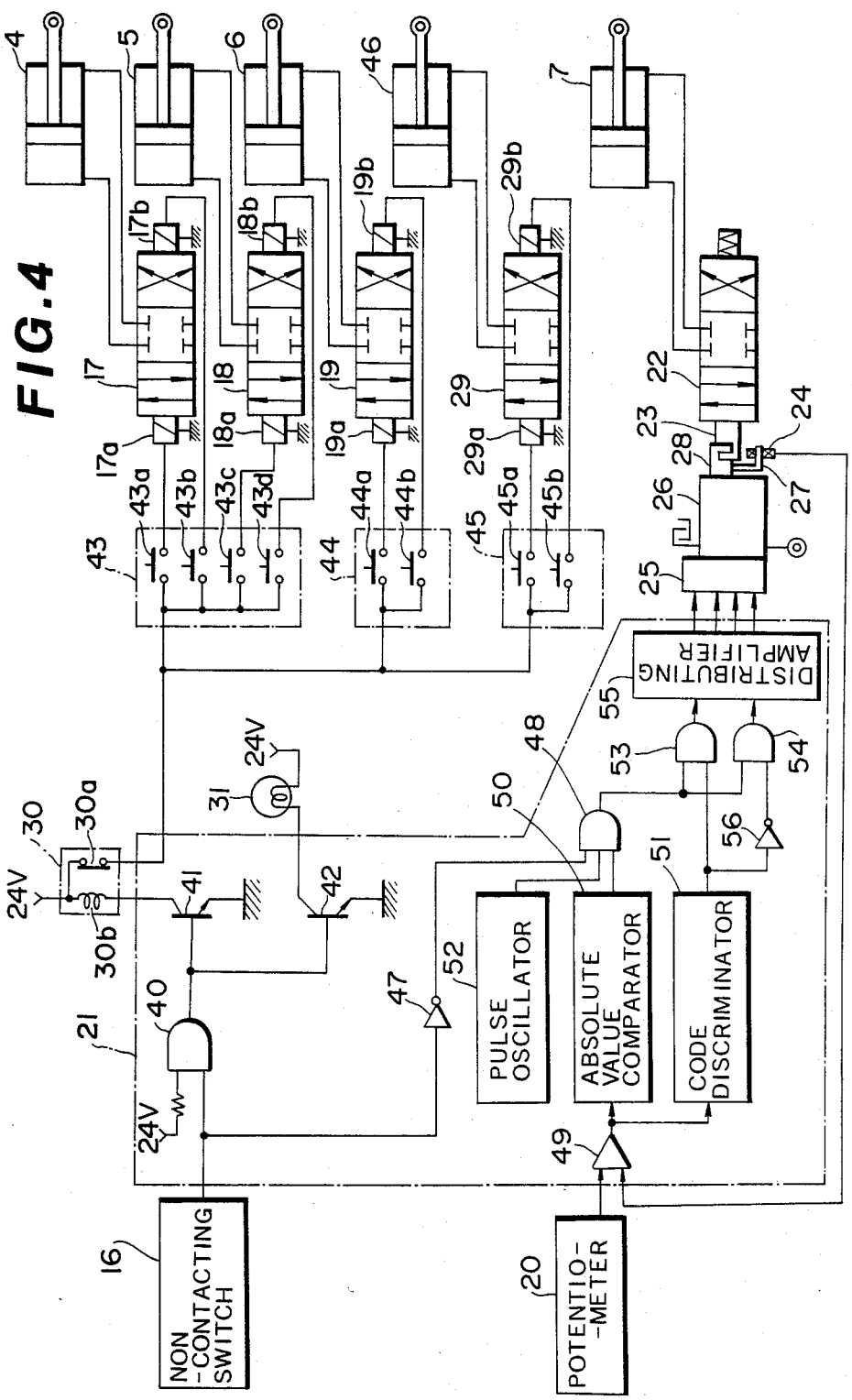
FIG. 4 is a block diagram of the electric hydraulic system shown in FIG. 2.

FIG. 4 is a block diagram of an electro-hydraulic system illustrating a preferred embodiment of the electric hydraulic control device for construction vehicles according to the present invention. In the system, when the lock lever 12 (FIG. 2) is in the free position and the non-contacting switch 16 is OFF, non-contacting switch 16 does not output a lock signal "1", disables an AND gate 40 of the controller 21, and turns off transistors 41 and 42 which receive the output of the AND gate 40 at their bases. As a result, a coil 30b of the relay 30 is not energized and the relay contact 30a becomes ON. Further, the lock indicating lamp 31 indicating lock condition goes off.

As the relay contact 30a becomes ON, a ripper lever switch 43, a blade lever switch 44, and a pin-puller lever switch 45 (these switches become ON and OFF in response to respective lever operation of the ripper lever 13, the blade lever 14, and the pin-puller lever 15) become ready to operate. When a contact 43a of the ripper lever switch 43 becomes ON, a solenoid 17a of the solenoid valve 17 is energized, and hydraulic fluid flows in the direction of retracting the ripper tilt cylinder 4, thereby causing the ripper 2 to tilt to the front. On the other hand, when the contact 43b becomes ON, a solenoid 17b of the solenoid valve 17 is energized, and hydraulic fluid flows in the direction of protracting the cylinder 4, thereby causing the ripper 2 to tilt to the rear. Similarly, when a contact 43c becomes ON, a solenoid 18a of the solenoid valve 18 is energized, and hydraulic fluid flows in the direction of retracting the ripper lift cylinder 5, causing the ripper 2 to rise. When a contact 43d becomes ON, a solenoid 18b of the solenoid valve 18 is energized, hydraulic fluid flows in the direction of protracting the cylinder 5, lowering the ripper 2. Furthermore, when a contact 44a of the blade lever switch 44 becomes ON, a solenoid 19a of the solenoid valve 19 is energized, hydraulic fluid flows in the direction of retracting the blade tilt cylinder 6, causing the blade 1 to tilt upward. When a contact 44b becomes ON, a solenoid 19b of the solenoid valve 19 is energized, and hydraulic fluid flows in the direction of protracting the cylinder 6, causing the blade 1 to tilt downward. On the other hand, when a contact 45a of the pin-puller lever switch 45 becomes ON, a solenoid 29a of the solenoid valve 29 is energized, hydraulic fluid flows in the direction of retracting the pin-puller cylnder 46, extracting the pin 3. When a contact 45b becomes ON, a solenoid 29b of the solenoid valve 29 is energized, and hydraulic fluid flows in the direction of protracting a cylinder 46, inserting the pin 3. Thus, protraction and retraction of the cylinders 4, 5, 6, and 46 are controlled by the solenoid valves 17, 18, 19 and 29, respectively.

On the other hand, output "O" of the non-contacting switch 16 is applied to an AND gate 48 after being inverted by an inverter 47, making the AND gate 48 ready to operate. When the blade lever 14 is manipulated in the C or D direction (FIG. 2), the potentiometer 20 applies a voltage signal corresponding to the lever stroke to a comparator 49 of the controller 21. To the other input of the comparator 49, a voltage signal corresponding to the position of the spool 23 of the control valve 22 has already been applied from the differential transformer 24. The comparator 49 compares the difference between those two voltage signals fed from the potentiometer 20 and the differential transformer 24, and applies the voltage difference to an absolute value comparator 50 and a code discriminator 51. The absolute value comparator 50 applies a signal "1" to the AND gate 48 when the absolute value of the voltage difference is not zero, i.e., when the stroke of the blade lever 14 and the spool position of the control valve 22 do not coincide with each other. Since the AND gate 48 has already been made ready to operate by the signal "1" fed from the inverter 47, it outputs a pulse signal to AND gates 53 and 54 in response to pulses fed from a pulse oscillator 52 and upon the reception of a signal "1" from the absolute value comparator 50. On the other hand, the code discriminator 51 detects whether the aforementioned voltage difference is positive or negative, and outputs a signal "1" when the voltage difference is positive. Accordingly, when the voltage difference is positive the AND gate 53 is enabled and a pulse signal is fed to a distributing amplifier 55 from the pulse oscillator 52 through the AND gates 48 and 53. When the voltage difference is negative, the AND gate 54 is enabled since a signal "0" is inverted by an inverter 56 and fed to the AND gate 54, and a pulse signal is fed to the distributing amplifier 55 from the pulse oscillator 52 via the AND gates 48 and 54. The distributing amplifier 55 amplifies the input pulse signals, and distributes the amplified pulse signals to drive the stepping motor 25. Also, the distributing amplifier 55, upon the reception of a pulse signal from the AND gate 53, causes the stepping motor 25 to turn normally, while upon the reception of pulse signal from the AND gate 54, the distributing amplifier 55 causes the stepping motor 25 to turn in reverse.

As the stepping motor 25 is driven by the controller 21, its driving force is applied to the stepping cylinder 26 through the boosting mechanism which employs hydraulic fluid, thereby causing the stepping cylinder 26 to protract and retract. Typically, the boosting mechanism is so designed wherein a rotary direct-acting spool (the structure and function of which is well known to those having ordinary skill in the art of electro-hydraulic stepping cylinders as illustrated on page 9 of the IHI Control Systems brochure published in August of 1980) is coupled to the output shaft of the stepping motor 25 and hydraulic fluid is controlled by the operation of this spool for the protraction and retraction of the stepping cylinder 26. The output shaft 28 of the stepping cylinder 26 is coupled to the spool 23 of the control valve 22, and the spool 23 is driven according to the protraction and retraction of the stepping cylinder 26.

On the other hand, since the movable core 27 for operating the differential transformer 24 is coupled to the output shaft 28 of the stepping cylinder 26, a voltage signal corresponding to the position of the spool 23 is outputted from the differential transformer 24. This voltage signal is fed to the comparator 49 of the controller 21 as mentioned above, and compared with the voltage signal of the potentiometer 29 which detects the lever stroke of the blade lever 14. Accordingly, the controller 21 drives the stepping motor 25 and controls the spool 23 so that both of these voltages signals coincide with each other, i.e., the lever stroke of the blade lever 14 and the spool 23 of control valve 22 coincide with each other. When the spool 23 is controlled to move to the left, hydraulic fluid flows from the control valve 22 in the direction of retracting the blade lift cylinder 7, causing the blade 1 to rise. When the spool 23 of the control valve 22 is controlled to move to the right, hydraulic fluid flows from the control valve 22 in the direction of protracting the blade lift cylinder 7, causing the blade 1 to descend. Thus, the cylinder 7 is controlled by the control valve 22 whose spool 23 is driven by an electro-hydraulic servo mechanism. Moreover, since the position of the spool 23 is controlled according to the stroke of the blade lever 14, up and down control of the blade 1 can be accomplished smoothly and delicately.

Now, assume that the lock lever 12 (FIG. 2) is in the lock position, and the non-contacting switch 16 is ON. In this case, the non-contacting switch 16 outputs a lock signal "1" to actuate the AND gate 40, and the transistors 41 and 42 are turned on by inputting the output of the AND gate 40 to their bases. As a result, the coil 30b of the relay 30 is excited and the relay contact 30a becomes OFF, and further the lock indicating lamp 31 indicating the lock condition lights.

As the relay contact 30a of the relay 30 becomes OFF, the ripper lever switch 43, the blade lever switch 44, and the pin-puller lever switch 45 become inoperative. As a result, manipulation of the ripper lever 13, the blade lever 14, and the pin-puller lever 15 which cause the contact of each switch to be ON or OFF does not excite the solenoids of the solenoid valves 17, 18, 19 and 20, and the ripper tilt cylinder 4, the ripper lift cylinder 5, the blade tilt cylinder 6, and the pin-puller cylinder 46 become inoperative.

The lock signal "1" outputted from the non-contacting switch 16 is inverted by the inverter 47, and fed to the AND gate 48, thereby disabling the AND gate 48. As a result, the AND gate 48 does not output the pulse signals regardless of the output condition of the potentiometer 20, and therefore stepping motor 25 is not driven. That is, the spool 23 of the control valve 22 is not driven, and the blade lift cylinder 7 becomes inoperative.

Though the electric servo mechanism for operating the spool of the control valve is comprised of the stepping motor and the stepping cylinder in this embodiment, various other configurations may be adopted. In such configurations, the capability to convert an electric signal to a large force is the only requirement. Moreover, in the present embodiment, solenoid valves are employed to control the hydraulic cylinders other than the blade lift cylinder, however, electromagnetic-hydraulic valves may also be used. Further, though the work tools of a bulldozer have been described, the present invention can be applied to work tools of various construction vehicles.

What is claimed is:

1. An electric hydraulic control device for a construction vehicle comprising:
    first signal generating means for generating a first electric signal corresponding to the operating position of an operation lever according to the operation of said operation lever;
    a first electric hydraulic control system for controlling a first direction control valve by means of said first electric signal, and supplying hydraulic fluid to a first hydraulic cylinder for driving a work tool according to the operation of said direction control valve;
    second signal generating means for generating a second electric signal corresponding to the stroke of said operation lever according to the operation of said operation lever; and
    a second electric hydraulic control system for controlling the position of a spool of a second control valve by means of a difference between said second electric signal and a third electric signal applied from an electric servo mechanism and corresponding to the position of said spool of said second control valve, said electric servo mechanism having a stepping motor driven in response to said difference, a stepping cylinder, and a differential transformer, and controlling said work tool, or the specific operation of said work tool according to the operation of said control valve.

2. An electric hydraulic control device as defined in claim 1 further comprising:
    a transmission lever;
    a lock lever for locking said transmission lever during a period when said transmission lever is in the neutral position;
    a detector means for detecting the placement of said lock lever in the lock position; and
    break means for breaking electric circuits of said first and second electric hydraulic control systems by means of the output of said detector.

3. An electric hydraulic control device as defined in claim 1, wherein said construction vehicle is a bulldozer, and said first hydraulic cylinder tilts the blade of said bulldozer and said second hydraulic cylinder raises and lowers said blade in response to the supply of hydraulic fluid.

4. An electric hydraulic control device as defined in claim 1, wherein said spool is coupled to said stepping motor, and said stepping cylinder is hydraulically controlled by said spool.

5. An electric hydraulic control device for a construction vehicle comprising:
    first signal generating means for generating a first electric signal corresponding to the placement of a first operation lever in one of two predetermined positions;
    a first electric hydraulic control system for controlling a first control valve by means of said first electric signal, and for supplying hydraulic fluid to a first hydraulic cylinder for controlling the movement of a first work tool along a first degree of freedom;

second signal generating means for generating a second electric signal corresponding to the stroke of said first operation lever during operation; and a second electric hydraulic control system for controlling the position of a spool of a second control valve by means of a difference between said second electric signal and a third electric signal formed in an electric servo mechanism and corresponding to the position of said spool, said electric servo mechanism having a stepping motor driven in response to said difference, a stepping cylinder, and a differential transformer, and controlling the movement of said first work tool along a second degree of freedom.

6. An electric hydraulic control device as defined in claim 5 further comprising:

a transmission lever;

a lock lever for locking said transmission lever during a period when said transmission lever is in its neutral position;

a detector means for detecting the placement of said lock lever in the lock position; and break means for breaking electric circuits of said first and second electric hydraulic control systems by means of the output of said detector.

7. An electric hydraulic control device as defined in claim 5, further comprising:

third signal generating means for generating a fourth electric signal corresponding to the placement of a second operation lever in one of two predetermined positions; and a third electric hydraulic control system for controlling a third control valve by means of said fourth electric signal, and for supplying hydraulic fluid to a third hydraulic cylinder for controlling the movement of a second work tool.

* * * * *